United States Patent [19]

Assaf et al.

[11] Patent Number: 5,492,274
[45] Date of Patent: Feb. 20, 1996

[54] METHOD OF AND MEANS FOR WEATHER MODIFICATION

[75] Inventors: Gad Assaf, Rehovot; Lucien Y. Bronicki, Yavne, both of Israel

[73] Assignee: Geophysical Engineering Company, Seattle, Wash.

[21] Appl. No.: 238,789

[22] Filed: May 6, 1994

Related U.S. Application Data

[63] Continuation of Ser. No. 72,875, Jun. 4, 1993, abandoned, which is a continuation of Ser. No. 780,071, Oct. 21, 1991, abandoned, which is a continuation-in-part of Ser. No. 548,544, Jul. 5, 1990, abandoned.

[51] Int. Cl.$^6$ .................................................. A01G 15/00
[52] U.S. Cl. ........................ 239/2.1; 239/14.1; 114/244
[58] Field of Search .................................. 239/2.1, 14.1, 239/265.11, 265.19; 60/641.7; 417/331; 165/45; 114/244, 245; 405/22, 23

[56] References Cited

U.S. PATENT DOCUMENTS

| | | | |
|---|---|---|---|
| 2,178,176 | 10/1939 | Lamm | 165/45 |
| 3,241,770 | 3/1966 | Reynolds et al. | 239/265.19 |
| 3,447,324 | 6/1969 | French | 239/265.19 |
| 4,014,279 | 3/1977 | Pearson | 60/641.7 |
| 4,209,991 | 7/1980 | Anderson | 60/641.7 |
| 4,470,544 | 9/1984 | Bronicki et al. | 239/2.1 |
| 4,577,679 | 3/1986 | Hibshman | 165/45 |

FOREIGN PATENT DOCUMENTS

| | | | |
|---|---|---|---|
| 709456 | 1/1980 | U.S.S.R. | 114/244 |
| 190387 | 12/1922 | United Kingdom | 114/244 |

OTHER PUBLICATIONS

*Steam Power From the Ocean in the Tropics*, vol. 65, No. 9, Andrews, pp. 328–330, Mar. 1, 1927.

Primary Examiner—Karen B. Merritt
Attorney, Agent, or Firm—Donald M. Sandler

[57] ABSTRACT

Weather in the vicinity of a land mass such as a continental arid zone near, and usually eastward of a body of water is modified by preferably propelling a ship pulling a submerged body having plurality of vertically displaced foils having an angle of attack that effects an upward displacement to the water in response to the surface displacement of the ship. The upward displacement of the water moves cooler sub-surface water toward the surface thereby cooling the surface water and reducing its heat loss in the summer. As a result, the heat capacity of the water is increased and additional heat will be stored in the water as a consequence of the greater absorption of solar radiation thereby increasing winter storms and the amount of rainfall over the land mass during the winter.

12 Claims, 4 Drawing Sheets

METHOD OF AND MEANS FOR WEATHER MODIFICATION

This application is a continuation of application Ser. No. 08/072,875, filed Jun. 4, 1993, now abandoned, which is a continuation of application Ser. No. 07/780,071, filed Oct. 21, 1991, now abandoned, which is a continuation-in-part of application Ser. No. 07/548,544, filed Jul. 5, 1990, now abandoned.

TECHNICAL FIELD

This invention relates to a method of and means for modifying weather in the vicinity of a body of water near a land mass, particularly a continental arid zone eastward of a body of water.

BACKGROUND ART

U.S. Pat. No. 4,470,544 issued Sep. 11, 1984(the '544 patent) discloses a method of and means for weather modification, and is hereby incorporated by reference. The '544 patent discloses positioning large numbers of pumps in a region of a body of water located west of a continental arid zone such that, during the summer, a large volume of deep, cold water is pumped to the surface thereby decreasing the surface temperature and increasing the heat storage capacity of the body of the water. The effect of an increase in the amount of heat stored at the surface of the body of water during the summer as a consequence of this arrangement is to increase the intensity of storms during the following winter over the land mass east of the region thereby increasing rainfall during the winter.

An object of the present invention is to improve this technique in providing a method of and means for modifying weather in the vicinity of a large body of water near a land mass.

DISCLOSURE OF INVENTION

According to the present invention, a method of and means for modifying the weather in the vicinity of a body of water near a land mass is provided where summers are dry and the majority of precipitation occurs during the winter, and where prevailing winds blow across the body of water onto the land mass. This situation occurs where the body of water is westward of a continental land arid zone. Furthermore, the present invention provides a method of and means for reducing summer rain and enhancing winter precipitation over a land mass in the vicinity of a body of water. These aims can be achieved by pumping cold water from the depths of the body of water to its surface over a large area enhancing the absorption of solar radiation during the summer and consequently increasing the amount of heat stored in the body of water. This will bring about an increase in the storm activity and intensity in the following winter over the land mass thereby increasing rainfall and/or precipitation during the winter.

In accordance with an embodiment of the present invention, apparatus for modifying weather in the vicinity of a land mass of the type described above, such as a continental arid zone usually eastward of a body of water includes a ship for floating on the body of water, and means for pumping cooler water from a lower depth of the body of water toward the surface in response to movement of the ship for the purpose of reducing the surface temperature of the body of water. When this action is carried out in the summer, the amount of heat stored in the body of water is increased causing enhanced winter precipitation over the land mass. Such methods and apparatus are also for use in the reducing summer rain, and enhancing winter precipitation over a land mass in the vicinity of a body of water.

Preferably, the pumping action is effected by trailing behind the ship, a submerged body carrying a plurality of vertically displaced foils having an angle of attack that effects an upward displacement to the water in response to the surface displacement of the ship. The upward displacement of the water moves cooler sub-surface water toward the surface thereby cooling the surface water and reducing its heat loss in the summer. As a result, the heat capacity of the water is increased and additional heat will be stored in the water as a consequence of the greater absorption of solar radiation.

BRIEF DESCRIPTION OF DRAWINGS

Embodiments of the present invention are described by way of example with reference to in the accompanying drawings wherein.

DETAILED DESCRIPTION

Figure 1:
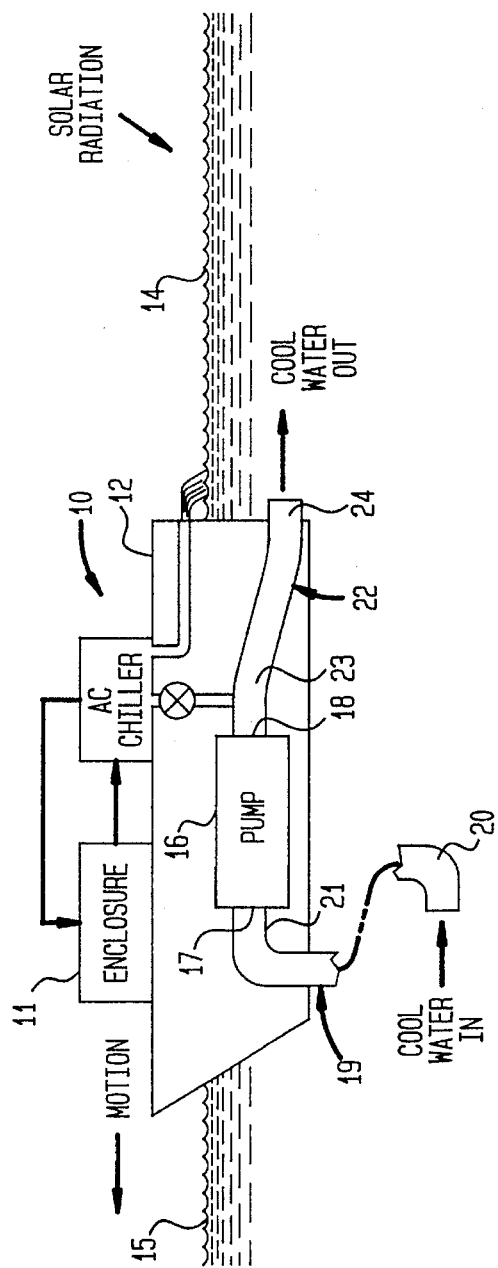
FIG. 1 is a schematic sectional representation of a ship designed for and operated in accordance with one embodiment of the present invention.

Reference numeral 10 designates a first embodiment of the present invention including pumping means such as ship floating on surface 14 of body of water 15 for decreasing the surface temperature and increasing the heat storage capacity of the water body during summer. Ship 12 contains pump 16, driven by a prime mover (not shown), the pump having inlet 17 and outlet 18. Preferably, pump 16 is a jet pump or air lift pump, these pumps being preferred because they are effective in inducing a large volume flow rate in the body of water which is advantageous for mixing this body of water. Inlet conduit 19 has inlet 20 at one end, and has, at the other end, outlet 21 connected to inlet 17 of the pump. Outlet conduit 22 has inlet end 23 connected to outlet 18 of the pump and outlet end 24, directed toward the stern of the ship, connecting to the exterior of the ship. Preferably, outlet 24 is at or just below surface 14 of body of water 15.

Inlet conduit 19 is of a length that extends to a depth far below surface 14 of the body of water to a stratum where the water temperature is considerably below the temperature of the water at surface 14. Various types of fin stabilization arrangements can be used for orienting inlet 20 of conduit 19 in a direction in which the ship is propelled.

In operation, the ship is positioned in the vicinity, usually, westward of a land mass such as a continental arid land mass during the summer, and the prime mover aboard the ship drives pump 16 such that cold water at inlet 20 of inlet conduit 19 is brought to the surface by the pump and then discharged through outlet 24. The thrust produced by the discharge of cold water through outlet 24 propels the ship in the water in a region adjacent the land mass. The cold water discharged by the pump mixes with surface water due to the jet thrust of the discharged water into the surface of the body of water, and due to movement of the ship on the surface. As a consequence, the surface water of the body of water adjacent, usually, westward of the land mass, is cooled enhancing the ability of the body of water to absorb solar radiation. As indicated, this occurs in the summer during peak solar radiation. Similar to the manner described in the '544 patent, the heat added to the body of water during the summer is effective during the winter to enhance the formation of storms which increases the level of rainfall on the land near, usually eastward of the region of the body of the water cooled in the manner described above. This embodiment is presently considered to be the best mode for carrying out the present invention.

Figure 2:
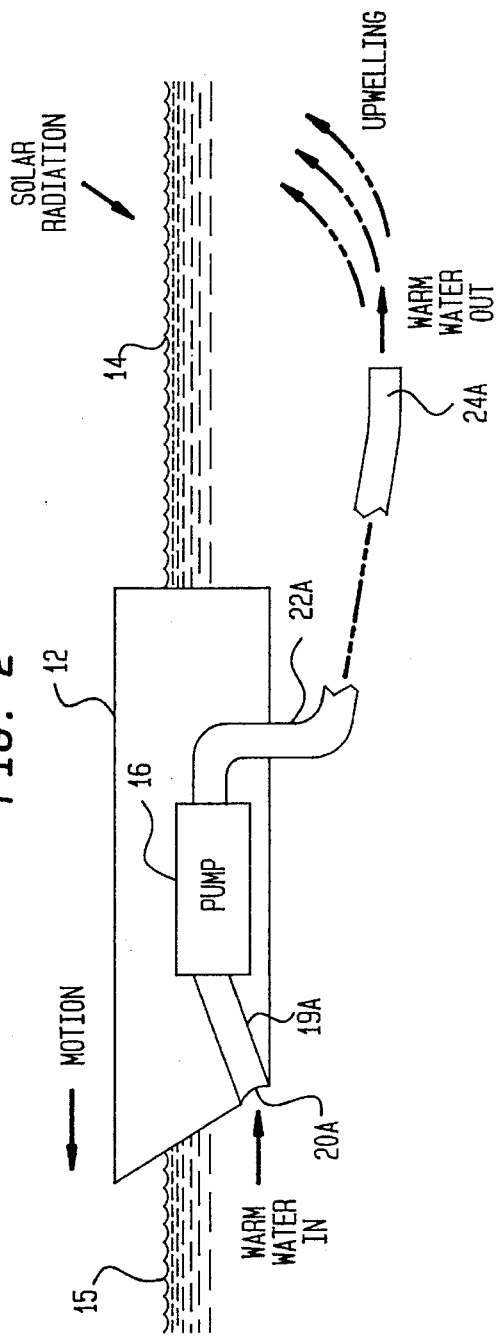
FIG. 2 is a side view of a ship showing a modification of the embodiment of the invention shown in FIG. 1.

In the embodiment shown in FIG. 2, pump 16 in ship 12 is provided with inlet conduit 19A, but inlet 20A of this conduit is forwardly directed relative to the ship and admits surface water to pump 16. Discharge conduit 22A connected to the outlet pump is elongated and has discharge end 24A trailing below the surface of the water at a depth where the temperature is considerably less than temperature at the surface of the water. That is to say, warm water entering the pump by reason of its operation is discharged into cold regions in the body of water typically relatively deep. The warm surface water at the discharge depth causes an upwelling at the discharge end of the conduit bringing nutrients from the discharge depth to the surface which enhances feeding for marine life as described in the '544 patent. The upwelling also cools the surface of the water in the region of the upwelling causing an increase in the absorption of solar radiation.

In each of the embodiments of FIGS. 1 and 2, the operation of a pump aboard a ship propels the ship in the body of water during the summer by pumping water from one depth of the body to another depth. The depths are selected such that a significant temperature difference exists between the two depths. In FIG. 1, water entering the pump is much colder than the surface water and is derived from deep within the body of water, and the cold water is discharged at the surface. In FIG. 2, the opposite situation exists in that surface water is pumped to a depth beneath the surface. In each case, however, the surface waters are cooled increasing the ability of the body of water to absorb heat due to incident solar radiation. Furthermore, particularly in the embodiment described in relation to FIG. 1, cold water coming from or pumped from the depths of the body of water can be used to condition or cool enclosures such as enclosure 11 on ship 12 shown in FIG. 1.

Figure 3:
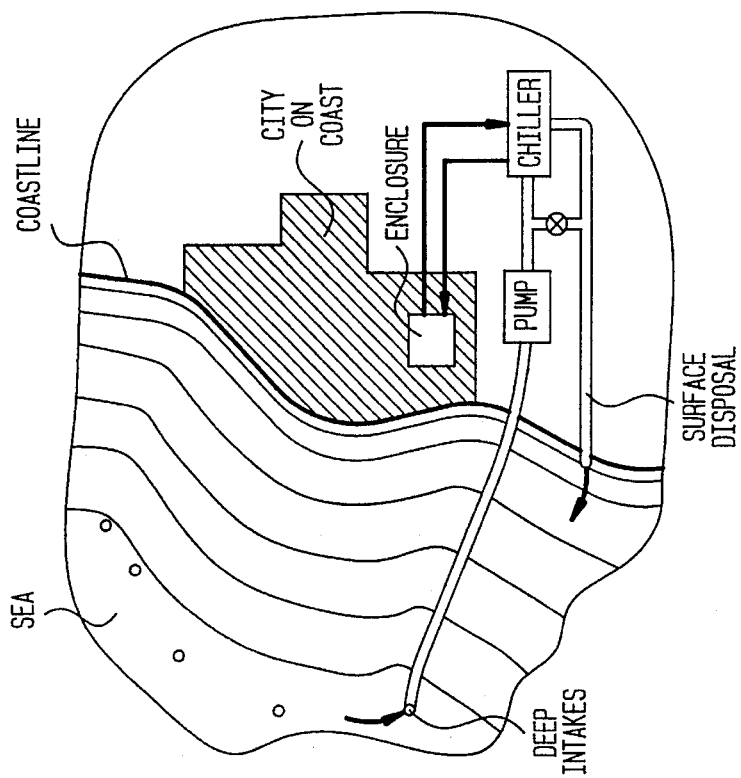
FIG. 3 is a schematic sectional view of another embodiment of the present invention.

In another aspect of the present invention, weather modification can be achieved on a local basis as indicated in FIG. 3 which shows the west coast of a land mass such as a continental arid region, and a city located on the coast. In the vicinity and westward of the city in the sea are located a plurality of intakes connected by pipelines to pumping stations near or in the city. Cold water from the depths of the body of the sea is conveyed from the deep intakes to the land by pumps which discharge the water into the surface near or remote from the shore thereby cooling the surface water and effecting weather modification in the manner described in the '544 patent. Also here, jet or airlift pumps may be used. Wave operated pumps and mixers may be preferred for this purpose and used in a manner similar to that described in the '544 patent. In addition, some of the water pumped from the deep intakes may be diverted to heat exchangers associated with enclosures in the city. The cooled water from the sea can be used for conditioning the air in the enclosures, for example in chillers. Thus, in the embodiment shown in FIG. 3, weather modification is effected, and as a by-product, air conditioning of enclosures is achieved.

Figure 4:
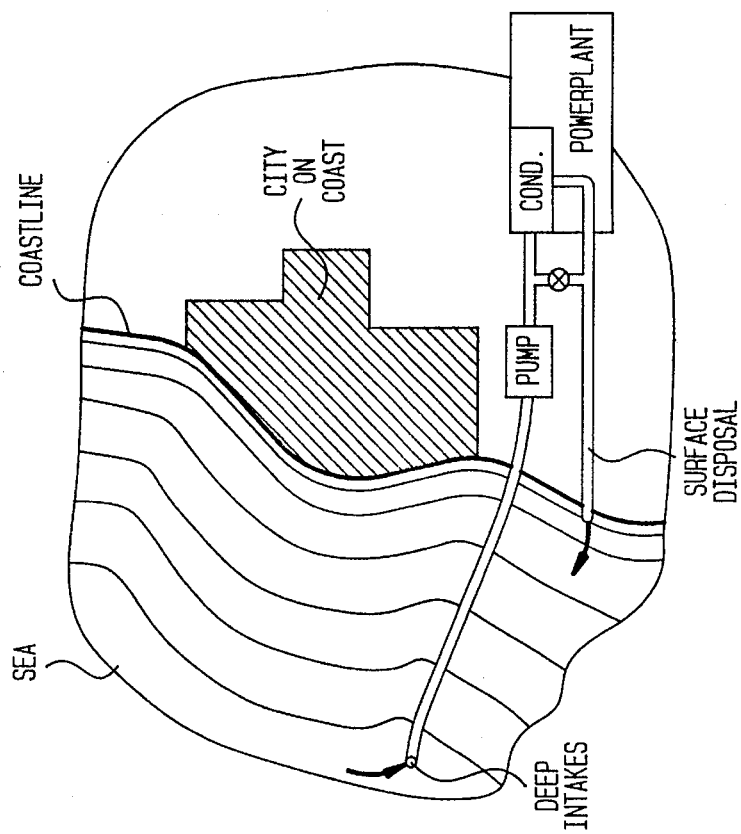
FIG. 4 is a schematic plan view of a further embodiment of the present invention.

In the embodiment shown in FIG. 4, water drawn from deep intakes in a body of water in the vicinity shown as west of a land mass can be used to cool condensers of a Rankine cycle power plant on the land as well as for modifying weather. Thus, for example, a portion of the cool water from the depths can be pumped to the condenser of a Rankine cycle power plant. Also here, jet, or airlift pumps, or wave operated pumps can be used with any pump, including conventional pumps, being suitable for pumping water to the condensers. Water from the condensers is then returned to the surface of the body of water together with the undiverted water discharged from the pump. Thus, the condensers add only a small amount of heat to the water discharged on the surface of the body of water and a significant increase in the ability of surface water to absorb heat is achieved for weather modification purposes. The power produced by the power plant will be available for the water pumping operation as well as for the usual industrial, commercial, and domestic uses.

Alternatively, the power plant itself can be built offshore using the deep water from the body of water for cooling the condensers providing a significant surface cooling to the body of water.

Figure 5:
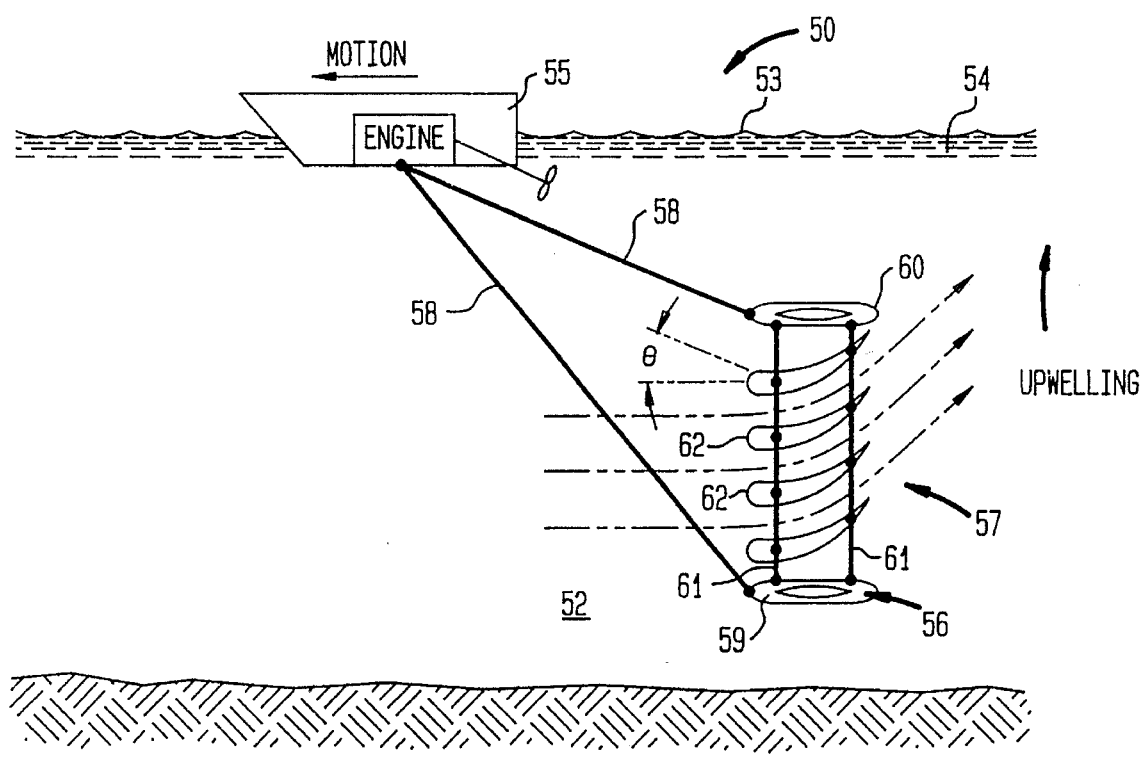
FIG. 5 is a schematic view of a further embodiment of the invention.

In further embodiment 50 of the invention shown in FIG. 5, cooler, deeper water at 52 is brought to surface 53, or near to the surface, of body of water 54 in response to movement of a ship 55 that tows submerged body 56 carrying means 57 that functions as a pump for pumping deep water to the surface. Ship 55 may be propelled by conventional means, such as by a screw propeller, and tows submerged body 56 attached to the ship by cables 58. Body 56 may include upper and lower housings 59, 60, each of which may be provided with horizontal stabilizers. Cables 61 may be provided to connect the two housings which are individually connected to the ship by cables 58.

Carried by cables 61 are a plurality of vertically displaced, vertically aligned, foils 62 which have an angle of attack θ selected to cause the foils to impart an upward component to water flowing through the foils. The foils, which all have the same angle of attack, extend transversely to the direction of displacement of the foils, act as a pump in the sense that water at a lower level in the body of water is brought to the surface in response to displacement of ship 55 on the surface.

Figure 5A:
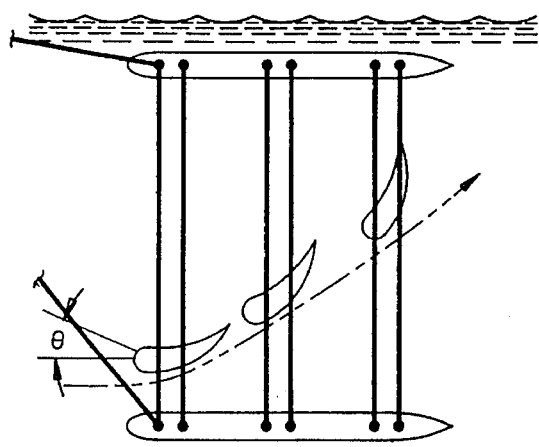
FIG. 5A is a modification of the embodiment shown in FIG. 5.
Figure 5B:
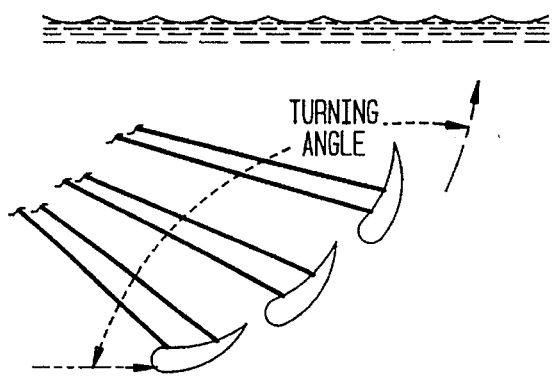
FIG. 5B is a further modification of the embodiment shown in FIG. 5.

FIGS. 5A and 5B show a modification of the embodiment of FIG. 5 in which the foils are vertically displaced, but are no longer in vertical alignment. Rather, the foils in FIGS. 5A and 5B are horizontally staggered such that the foils can have the same (FIG. 5A) or different (FIG. 5B) angles of attack. In this arrangement, the foils act to turn the deeper water through a large angle as the deeper water is brought to the surface.

Figure 6A:
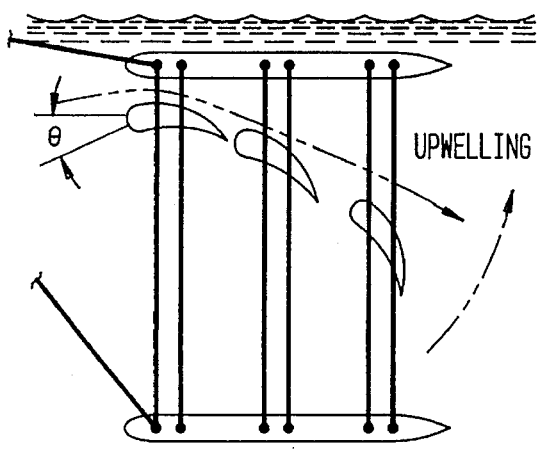
FIG. 6A is a schematic view of a further embodiment of the invention.
Figure 6B:
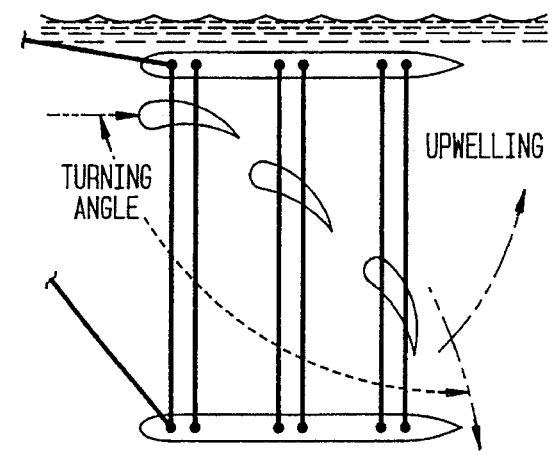
FIG. 6B is a modification of the the embodiment shown in FIG. 6A.

In the embodiment of FIGS. 6A and 6B, the upwelling effected by the apparatus of the present invention is caused by forcing warmer, lighter water near the surface to a greater depth where mixing with cooler denser water takes place causing an upwelling as indicated. In FIG. 6A, the foils are horizontally staggered, and are out of vertical alignment. In this arrangement also, the angle of attack can be the same (FIG. 6A) or can increase, for example, from front to rear as in FIG. 6B.

In addition, the above-described embodiments of the present invention can be used for reducing summer rain and enhancing winter precipitation over a land mass in the vicinity of a body of water. These aims can be achieved by pumping cold water from the depths of the body of water to its surface over a large area to enhance the absorption of solar radiation during the summer and consequently increasing the amount of heat stored in the body of water. This will bring about an increase in storm activity and intensity in the following winter over the land mass thereby increasing rainfall and/or precipitation during the winter.

The advantages and improved results furnished by the method and apparatus of the present invention are apparent from the foregoing description of the preferred embodiment of the invention. Various changes and modifications may be made without departing from the spirit and scope of the invention as described in the appended claims.

We claim:

1. A method for modifying weather in the vicinity of a continental arid zone eastward of a body of water, said method comprising the steps of:
   a) propelling a ship in the body of water during the summer;
   b) effecting the transfer of cooler water from a lower depth in the body of water to the surface of the body of water in an amount sufficient to cool the surface water and thereby increase the heat storage capacity of the body of water, and in response to movement of the ship; and
   c) wherein warmer water near the surface of the body of water is pumped to a lower depth for effecting upwelling of cooler water from the lower depth to the surface.

2. Apparatus for modifying weather in the vicinity of a continental arid zone eastward of a body of water comprising:
   a) a ship for floating on said body of water;
   b) means responsive to movement of the ship for pumping water from a lower depth in the body of water to the surface of the body of water in an amount sufficient to cool the surface water and thereby increase the heat storage capacity of the body of water whereby the amount of heat stored in the body of water during the summer is increased causing enhanced winter precipitation over said zone;
   c) wherein said means responsive to movement of the ship for pumping includes a submerged body connected to the ship for movement therewith and means on the body for imparting upwelling in the water in response to movement of the submerged body;
   d) wherein said means on said body includes a plurality of vertically displaced foils; and
   e) wherein the angle of attack of the foils is such that the flow of water through the foils, in response to the movement of the ship and said submerged body, has an downward component.

3. Apparatus according to claim 2 wherein said foils have different angles of attack.

4. Apparatus according to claim 3 wherein said foils are effective to move surface water to a lower depth.

5. Apparatus according to claim 2 wherein the foils have the same angle of attack.

6. Apparatus according to claim 5 wherein said foils are effective to move surface water to a lower depth.

7. Apparatus according to claim 2 wherein said foils are horizontally staggered.

8. Apparatus according to claim 7 wherein said foils have the same angle of attack.

9. Apparatus according to claim 8 wherein said foils are effective to move surface water to a lower depth.

10. Apparatus according to claim 7 wherein said foils are effective to move surface water to a lower depth.

11. A method for pumping relatively cool water from a lower depth in a body of water to near the surface thereof by using a submerged body connected to a ship for movement therewith, said body having a plurality of curved foils each having an angle of attack, the foils being arranged serially in the direction of movement, and at different depths such that forward movement of the body causes upwelling of deeper water.

12. Apparatus for modifying weather in the vicinity, of a continental arid zone eastward of a body of water comprising:
   a) a ship for floating on the surface of said body of water; and
   b) ship for propulsion means operative to propel the ship on the surface by pumping water from one depth to another in an amount sufficient to cool the surface of the body of water thereby increasing the heat storage capacity of the body of water whereby the amount of heat stored in the body of water during the summer is increased causing enhanced winter precipitation over said zone; and
   c) wherein said pump is operative to pump warmer water near the surface to a lower depth for effecting upwelling of cooler water from the lower depth to the surface.

* * * * *